United States Patent [19]

Phillips

[11] Patent Number: 5,210,980
[45] Date of Patent: May 18, 1993

[54] DIAMOND GRINDING MACHINE FOR THREADING AND FORMING HARD MATERIALS SUCH AS CERAMICS, CARBIDE AND GLASS OBJECTS

[76] Inventor: Edwin D. Phillips, 170 Albert St., N. Plainfield, N.J. 07060

[21] Appl. No.: 610,252

[22] Filed: Nov. 8, 1990

[51] Int. Cl.⁵ .............................................. B24B 49/00
[52] U.S. Cl. ................... 51/165.77; 51/165.8; 51/95 TG; 51/165.84
[58] Field of Search ............... 51/95 TG, 288, 100 R, 51/101 R, 165.77, 165.8, 165.81, 165.84

[56] References Cited

U.S. PATENT DOCUMENTS

| | | |
|---|---|---|
| 2,397,463 | 4/1946 | Boeck et al. ........................ 51/288 |
| 2,426,139 | 8/1947 | Bishop et al. . |
| 2,454,916 | 11/1948 | Gamble . |
| 2,623,333 | 12/1952 | Baldenhofer ................... 51/95 TG |
| 3,512,306 | 5/1970 | Phillips . |
| 3,538,647 | 11/1970 | Woloszyn . |
| 3,849,944 | 11/1974 | Noll . |
| 4,930,265 | 6/1990 | Belthle .............................. 51/288 |
| 4,953,325 | 9/1990 | Unser ............................. 51/95 TG |

Primary Examiner—M. Rachuba

[57] ABSTRACT

A versatile thread grinding machine includes a grinding wheel with concentric thread forms thereon, rotatable about a first axis, and a work spindle which is rotatable about a second axis. Both the angularity and distance between the axes may be varied. In order to produce threads having different leads with a single grinding wheel, the work spindle is provided with externally threaded sections having different leads which are integral multiples of the grinding wheel thread pitch. One of a correspondingly threaded set of inserts is brought into engagement the corresponding threaded section, to produce the desired lateral feed rate of the workpiece.

7 Claims, 10 Drawing Sheets

APPROX. 2°

DIAMOND GRINDING MACHINE FOR THREADING AND FORMING HARD MATERIALS SUCH AS CERAMICS, CARBIDE AND GLASS OBJECTS

BACKGROUND OF THE INVENTION

1. Field of the invention

This invention relates generally to devices for forming machine threads or other circular forms on glass, ceramics or carbide work pieces.

2. Description of the Prior Art

The art of cutting a thread on glass, ceramics, carbide or other hard materials is described in applicant's previous U.S. Pat. No. 3,512,306. In advancing the present state of the art, certain improvements have been made to automate the equipment and increase its versatility, making it possible to make additional products.

A common problem with known devices for threading glass, ceramics or carbide objects is that the devices are generally manually operated and are fairly difficult to operate. There have been threading machines which operate automatically, but such devices have known drawbacks.

One problem with previous apparatuses for cutting hard materials is that the expensive diamond bonded cutting wheels are not provided with sufficient protection to prevent damage from other elements of the device.

Existing prior patents which may be pertinent to the present invention includes U.S. Pat. Nos. 2,454,916, 2,426,139, 3,538,647, and 3,849,944. U.S. Pat. No. 3,538,647 describes a device in which the work is moved while the grinder is stationary. U.S. Pat. No. 2,454,916 relates to the feeding of the workpiece being cut, while U.S. Pat. No. 2,426,139 discloses a control system for such a device. U.S. Pat. No. 3,849,944 shows a work holder which pivots to the grinding position.

SUMMARY OF THE INVENTION

An object of the present invention is to provide a glass cutting device which permits precision forming of grooves, shapes and threads in glass, ceramics, carbide or other hard materials and yet provides protection for the diamond cutting wheel from damage from associated elements of the device, or from the work piece itself.

Another object is to change the shape of the thread, form so as to increase the life of the expensive diamond abrasive wheel.

Another object of the present invention is to provide an apparatus which will automatically and accurately form threads, grooves and other shapes, in hard materials.

A further object of this invention is to provide an apparatus which Will cut various shapes in different types of hard materials quickly and with great precision.

In the present competitive market there is a need to produce well formed and accurate shapes on glass and other hard materials. One required tool component for producing a shape such as a thread is an accurately made diamond bonded cutting wheel with precision grooves cut into its periphery. Such a wheel is costly to produce. The automatic features and the safety devices of the present invention defined herein insure a uniform wear on the grinding wheel and protection from accidental damage in case the operator drops the spindle mounting plate, thus causing the workpiece to hit the diamond grinding wheel, damaging or ruining the expensive grinding wheel.

These, together with other objects and advantages which will become subsequently apparent, reside in the details of construction and operation as more fully hereinafter described and claimed with reference to the accompanying drawings.

BRIEF DESCRIPTION OF THE DRAWINGS

FIGS. 6 through 8 show items easily ground on this machine. Specifically.

FIGS. 7A & 7B show some unusual items which can easily be ground with specially formed grinding wheels.

DETAILED DESCRIPTION OF THE PREFERRED EMBODIMENT

Figure 1:
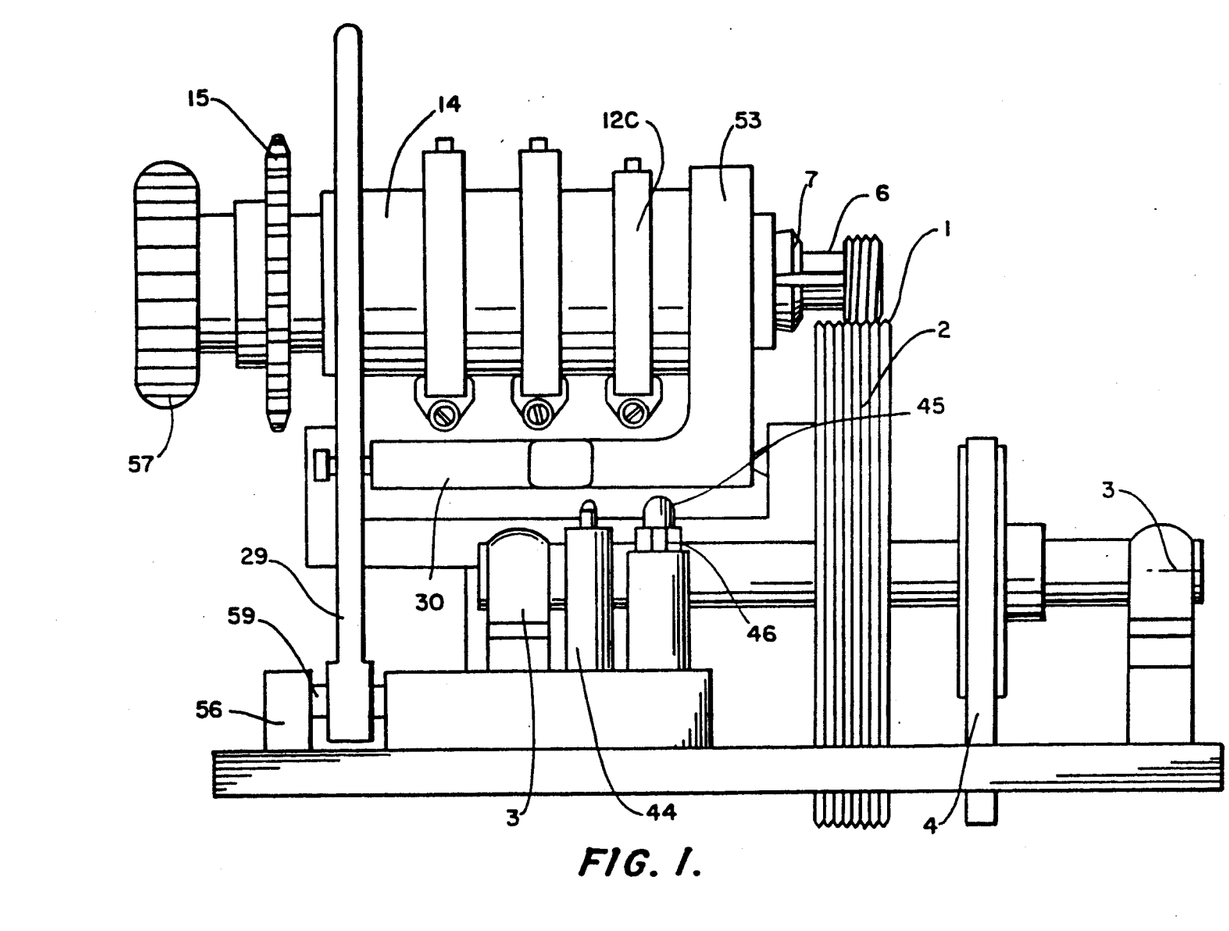
FIG. 1 is a front elevation of the machine of the present invention.

FIG. 1 shows a diamond bonded wheel 2 having plural grooves 1 that are concentric about the periphery of the bonded wheel and conform to the shape, width, and depth of the required thread or shape The pitch or lead of the thread is produced by the rate of the lateral movement of the thread per revolution. In other words, a 32-pitch thread requires 32 revolutions of the work piece for each inch of lateral travel across the face of the grooves. With a single cutting wheel, one can produce threads of different pitch merely by changing the rate of feed of the workpiece. For each different pitch thread size, a different diamond bonded grinding wheel and a matching set of master lead screws, and a corresponding master cam insert are required.

The base plate 11 of the machine is mounted on a bench, under which is mounted the a continuously operated drive motor (not shown) for the grinding wheel 2, along with a sump and pump for the water coolant. These items, not shown, are conventional. The water guards are partially cut away to increase clarity.

Figure 2:
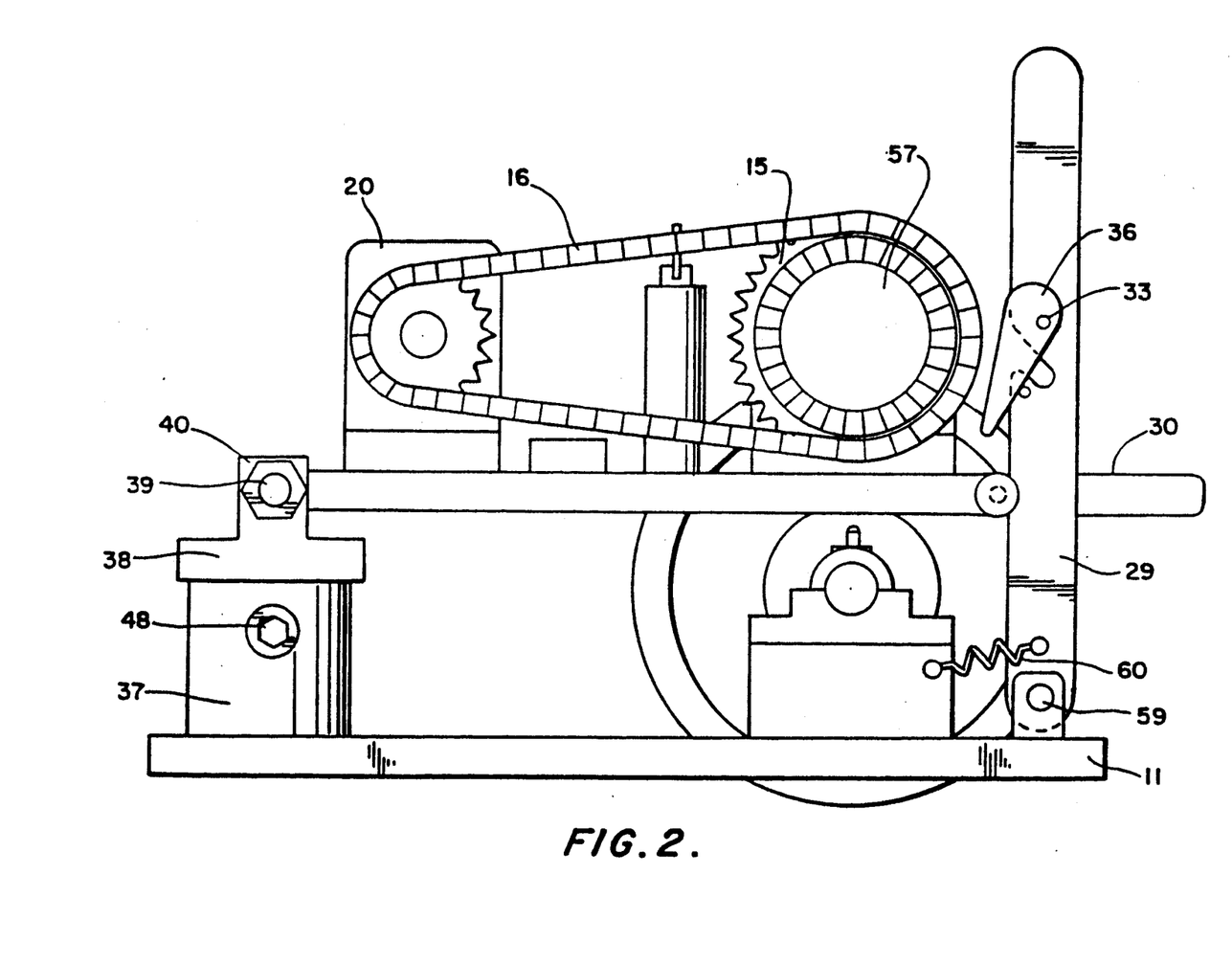
FIG. 2 is a side elevational view thereof.
Figure 3:
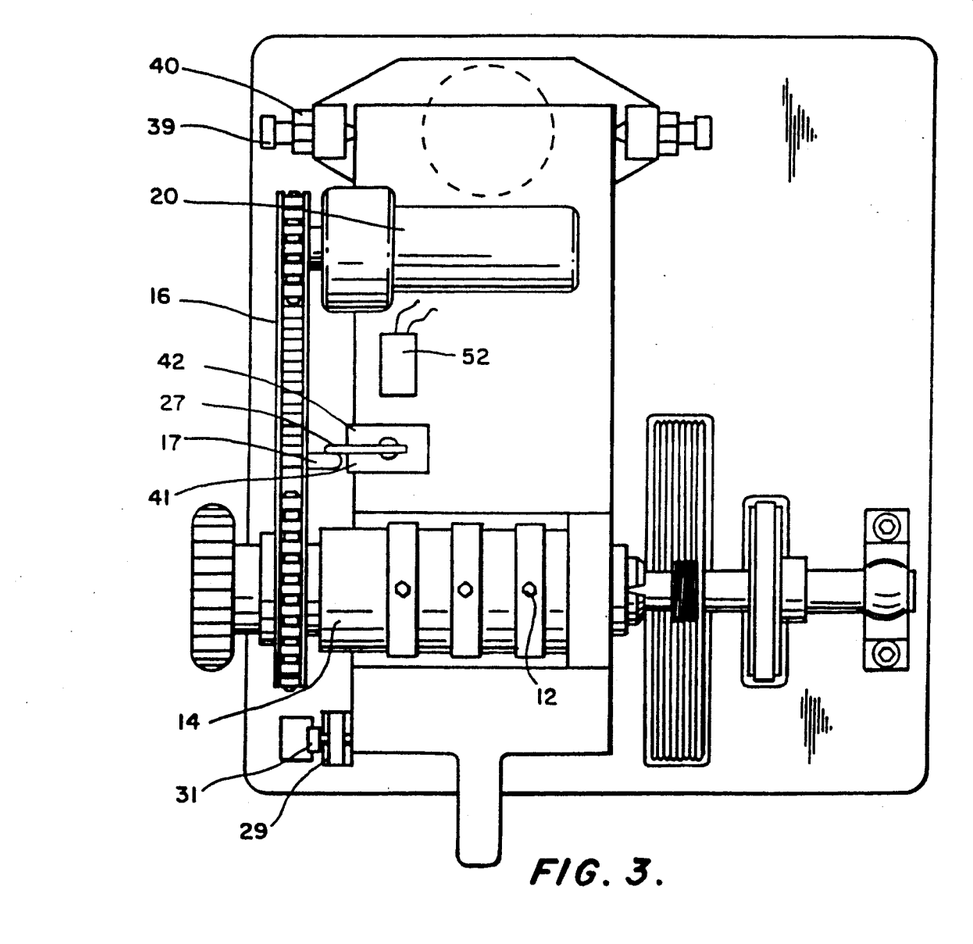
FIG. 3 is a top plan view thereof.

All of the other machine components are mounted on the base plate 11. As shown in FIG. 2, a support post 37 extends upward from the base plate, and a yoke 38, rotatably mounted on the support post, is secured in position by a locking screw 48. The spindle mounting plate 30 is mounted, at one end, to the yoke by two tapered pivot screws 39 secured by two locking nuts 40 (FIG. 3). Thus, the spindle mounting plate may be moved up and down vertically with respect to the diamond grinding wheel by moving the yoke which may be rotated and locked into position with respect to the grinding wheel. This allows the work to be aligned, to produce a tapered form or to square the spindle with the grinding wheel.

In FIG. 1, the diamond bonded grinding wheel 2 is shown resting in two self aligning bearings 3. The bearings are shown without a top clamp, as the weight of the grinding wheel assembly and the downward force of the motor drive belt 4 is sufficient to keep the grinding wheel assembly firmly in place. This allows for easy and quick replacement of the wheel assembly for the new thread size or form.

Figure 4:
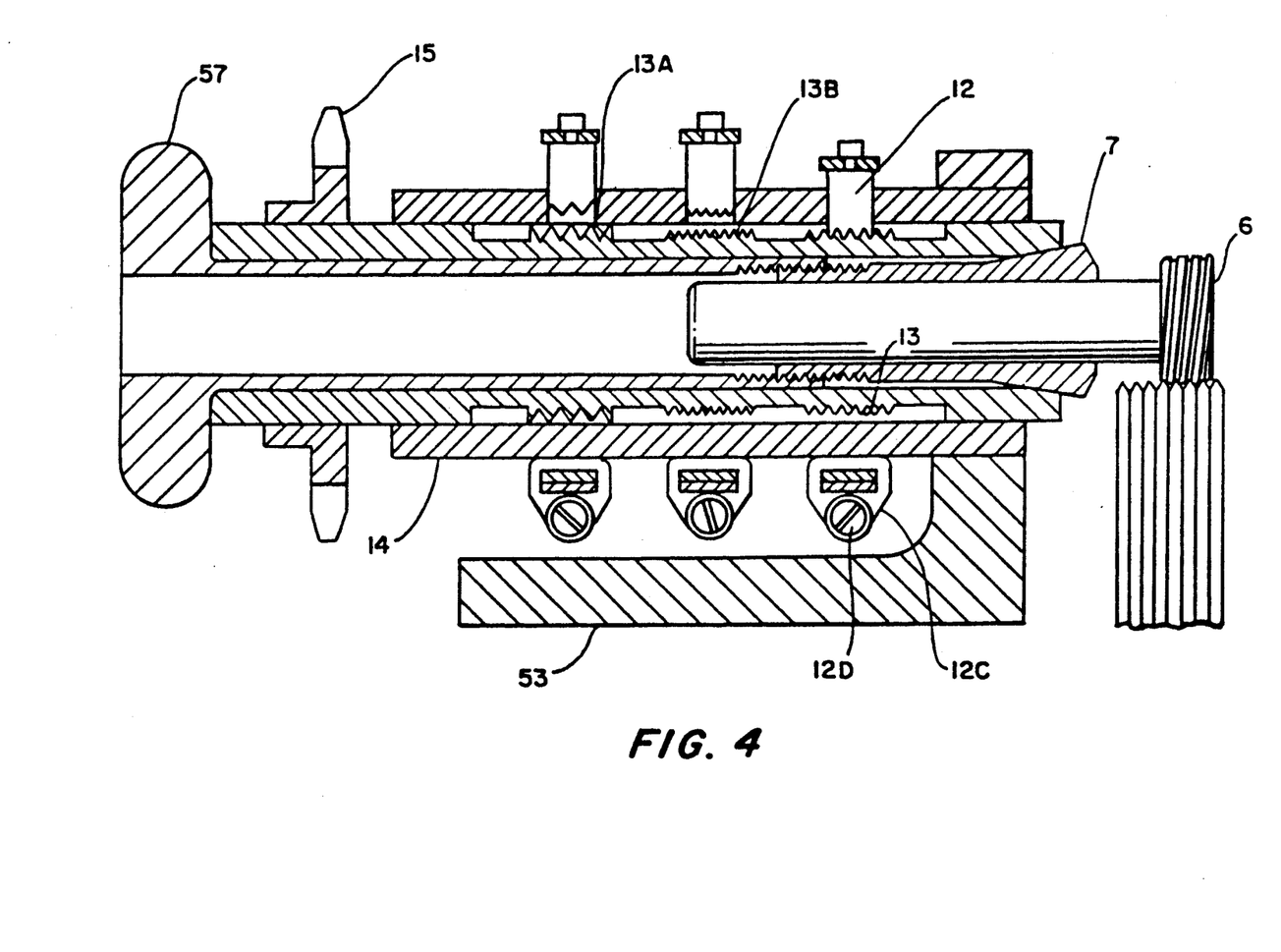
FIG. 4 is a cross-sectional view of a work spindle.
Figure 5A:
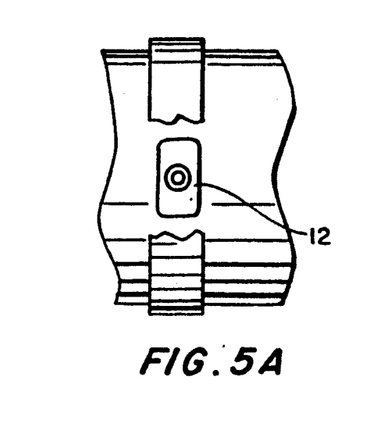
FIG. 5 is a view of a master cam and its relationship to the lead screw.
Figure 5B:
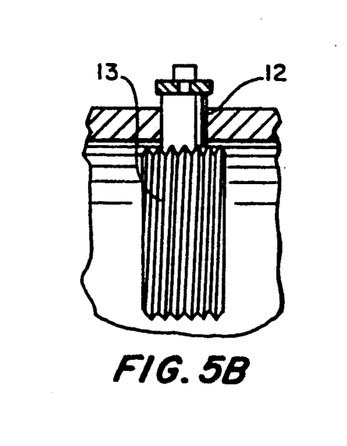

In FIG. 4, the work spindle 14 is shown in cross section. A glass work piece 6 is shown clamped into position by a soft plastic chuck 7, which is withdrawn into the master spindle 49 by a drawbar 57. The master spindle assembly is free to rotate in the bearing housing 14 (FIG. 2) and is driven via a chain 16 by a sprocket 15 attached to the master spindle 49. The whole assembly is held in the spindle mounting block 53 and is clamped into position by the bolt 52, as shown in FIG. 1

In order to out a thread, the work piece 6 must be rotatably advanced across the face of the diamond bonded wheel 2 in FIG. 1. The rate of the advance and the direction of rotation during advance determines the pitch of the thread and also the direction of the lead, i.e., right or left handed thread. The diamond bonded wheel produces the shape and size of the thread form. In this manner the same diamond bonded wheel will generate any pitch diameter. However, every different pitch must have its own master spindle and master cam.

The diamond abrasive wheel is an expensive tool. There are certain things which can be done to extend significantly the life of the wheel. Sharp edges on the wheel break down very quickly and must be avoided. Also, sharp edges on the hard work piece chip and break Very easily; therefore, the radii on the abrasive Wheel are important, and the larger the radius, the longer the Wheel life Consequently, in generating a thread on glass, ceramics, or carbide it is desirable to change the shape from the sharp tooth form of the American type thread to a rounded form. FIG. 6C shows a standard 60 thread with a radius formed on both top and bottom. Another desirable thread form is the standard bottle thread form shown in FIG. 6D.

In some applications, it is desirable to have a very coarse thread in order to produce a large linear movement with a small rotational movement. However, the thread becomes weaker as the pitch is reduced. In order to solve this problem, a double or even a triple thread can be used. For example, two threads of eight pitch are used to make up the strength and appearance of a sixteen-pitch thread but have the linear travel of an eight-pitch thread. A four- or five-pitch thread would in most cases be impractical. But by using three four-pitch threads it would have the strength and appearance of a twelve-pitch thread and having the linear travel of a four-pitch thread.

The advantage of this machine is that a single, double, or triple pitch threads can be formed in a single pass. In the case of a double eight-pitch thread the grinding wheel would have the thread dimension and shape of a sixteen-pitch thread but the master lead screw would be an eight pitch. In the case of the triple four-pitch, the wheel would have the dimensions of a twelve-pitch thread but the master lead screen would have a four-pitch. The resulting thread in the work piece would move 0.25 inch per revolution.

A very important feature of this invention is the design of the master spindle 49. The spindle has three sections 13,13A,13B. At each of these sections, a different master pitch is ground into the master spindle. For form grinding, a zero pitch can be grooved into one section. These sections can be ground in any combination, since each section is independent of the other.

In order for the spindle to produce the correct horizontal movement, a master cam insert 12,12A or 12B is fit into and through the bearing housing as shown in FIG. 4. The master cam insert has the same master form as that ground into the matching spindle section. When the spindle assembly 49 is rotated by the drive motor 20 (FIG. 3) through the chain 16 and sprocket 15, the work piece 6 is rotatably advanced across the face of the diamond bonded wheel 2, thereby producing the desired pitch and lead.

When grinding a precision thread or form, there can be no lost motion in the movement of the spindle due to looseness between the master cam insert and the master spindle. In order to eliminate any free play and to compensate for wear a metal strap such as a hose clamp 12C is placed around the bearing housing 14, contacting the master cam insert 12. When the clamp screw 12D is tightened, it draws the clamp around the bearing housing to produce a small force on the master cam insert, forcing it into the master spindle to eliminate any lost motion.

In order to produce a different pitch or lead, the master cam insert 12 is removed and either insert 12A or 12B is inserted into the bearing housing to mate with the proper master spindle section 13A or 13B. BY providing three different pitches on the master spindle, only a third of the number of spindles that would otherwise be required for all the various pitches and leads are needed.

Figure 11:
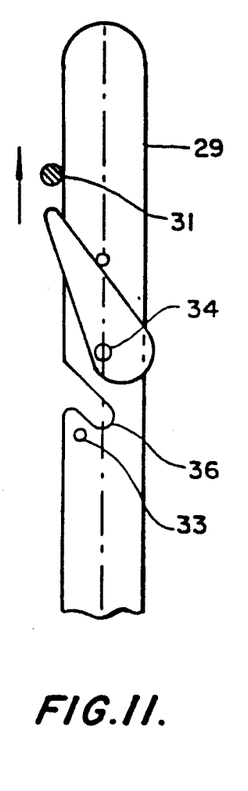
Figure 12:
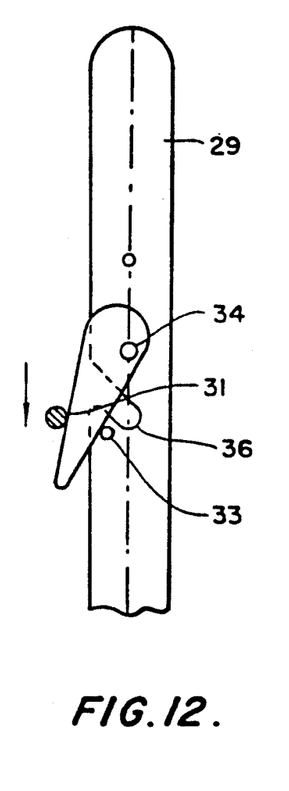

In order to ensure that a full thread or form is generated, the work piece 6 must be rotated more than 360°. The limit switches 41 and 42 (FIGS. 3 and 11), when activated by the reversing pin 17 and the operating spring 27, throw the latching relay 47 (FIG. 12). which reverses the D.C. polarity and thus the direction of rotation of the motor 20. The switches and their operating spring 27 are mounted in such a way as to allow the reversing pin 17 to rotate 10° to 20° past center before the operating spring actuates either switch. This allows a rotation of up to 400° to insure the complete form is ground.

Figure 6A:
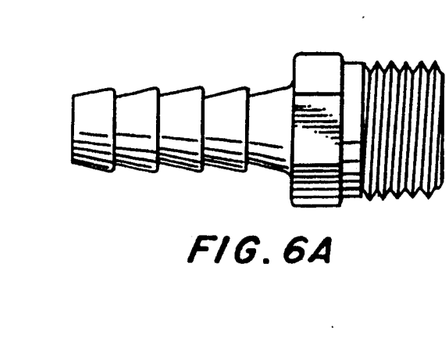
FIG. 6A shows a standard hose connector.
Figure 6B:
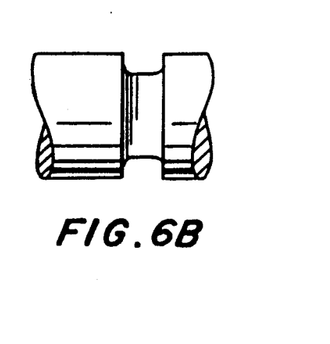
FIG. 6B shows a simple groove.
Figure 6C:
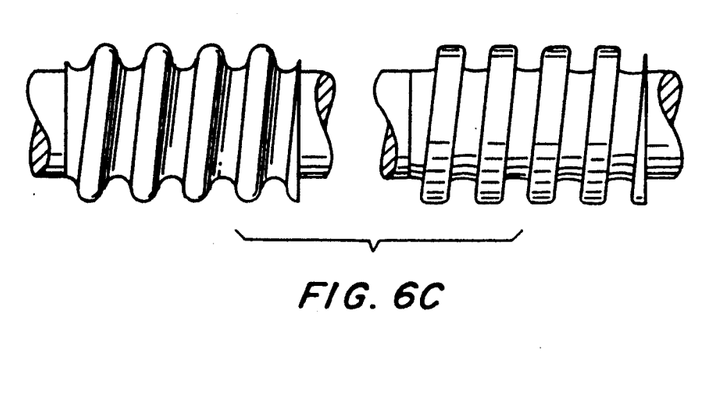
FIG. 6C illustrates several modified thread forms; and 6D depicts a standard bottle thread.
Figure 6D:
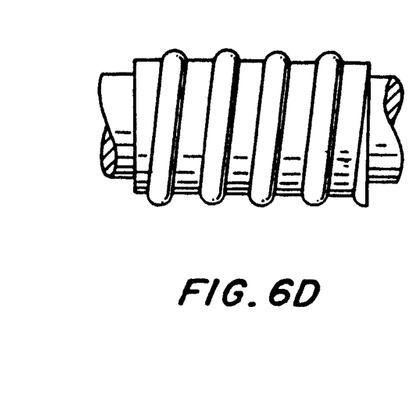
Figure 7A:
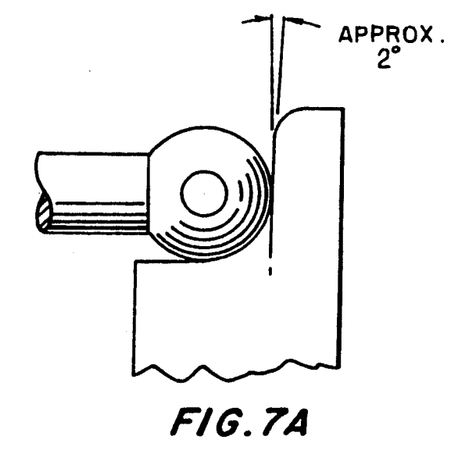
FIG. 7A shows the round end of a pestle.
Figure 7B:
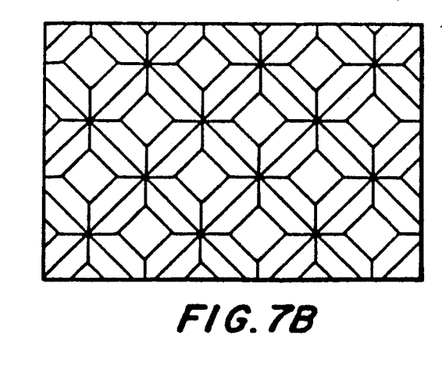
FIG. 7B shows a diamond knurl.
Figure 8A:
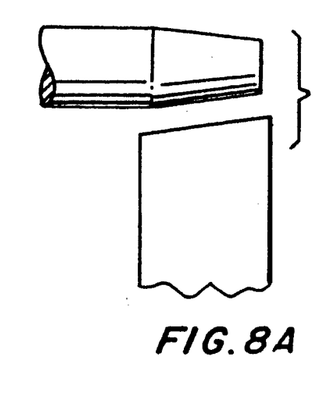
FIGS. 8A, B, & C shows various tapers which can be formed by using angle faced diamond grinding wheels.
Figure 8B:
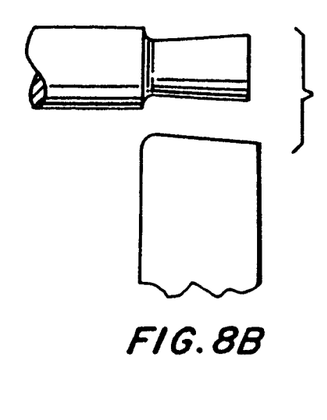
Figure 8C:
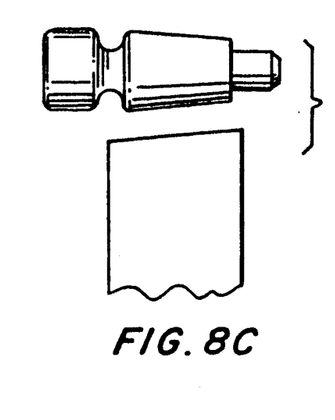

In order to illustrate the versatility of the invention, FIGS. 6 - 8 illustrate several different items which can be generated.

In FIG. 6A, a hose connector is shown which is easily made on this machine. The threaded end can be made as described previously. The tapered tube end is made by simply placing the master spindle on the desired angle With a zero pitch master cam and the proper shape formed in the diamond grinding wheel.

FIG. 6B shows modified thread forms which can easily be made with the proper shape formed in the diamond grinding wheel; using the master cam, any tooth form and pitch can be made. The standard bottle thread form (FIG. 6D) is probably the most significant of the many standard threads which can be made.

An unusual item which can be formed is a pestle, FIG. 7A. The diamond bonded wheel is formed into a round bottom "V" shaped groove. The master spindle is thrown on an angle so that the spherical end of the pestle can be formed into a sphere of more than 180°.

In FIG. 7B, a diamond knurl is shown (pictured as a flat surface for clarity). This is easily made by using the proper diamond and either reversing the work 180° in the chuck or using a right and left hand thread.

In FIGS. 8A-8C, various tapers are shown made in an unusual way: by using a diamond grinding wheel with an angular face. This can be used to grind a standard taper or a reverse taper. In FIG. 8C a stopcock is shown to demonstrate that this is a very accurate method of grinding a taper. The taper can also be made using the tapered thread grinding attachment described in FIG. 14.

Figure 9:
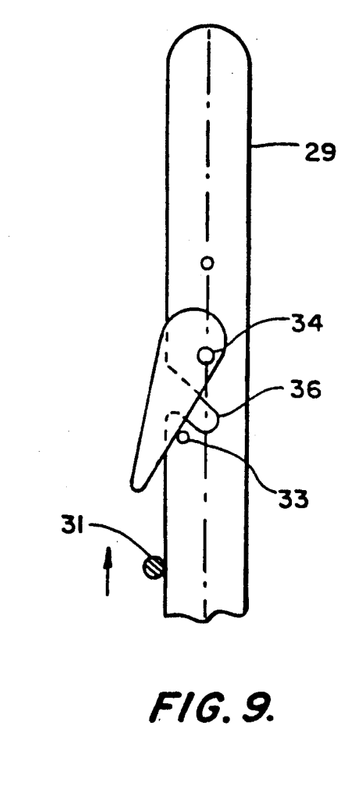
FIGS. 9, 10, 11 and 12 are enlarged views of the safety latch mechanism of various stages of operation.

In order to protect the expensive diamond bonded wheel, a safety latch 29 shown in FIG. 2 is attached to the base plate 11 through a mounting block 56 and a pivot pin 59. This latching means provides a safety catch and a position for loading and unloading. The latch 29 is biased against the shoulder pin 31 by a spring 60. In FIGS. 9-12 the latching mechanism is shown in detail, with FIG. 9 illustrating the operating position with the latching arm resting against the shoulder pin 33, which is attached to the pivoted spindle plate 30. At the completion of each cycle, the spindle plate is raised by the air piston 43 (FIG. 15) past the notch 36 and as the air is released the shoulder pin is trapped and held in the notch as shown in FIG. 2. This is the load and unload position plus the safety position.

Figure 13:
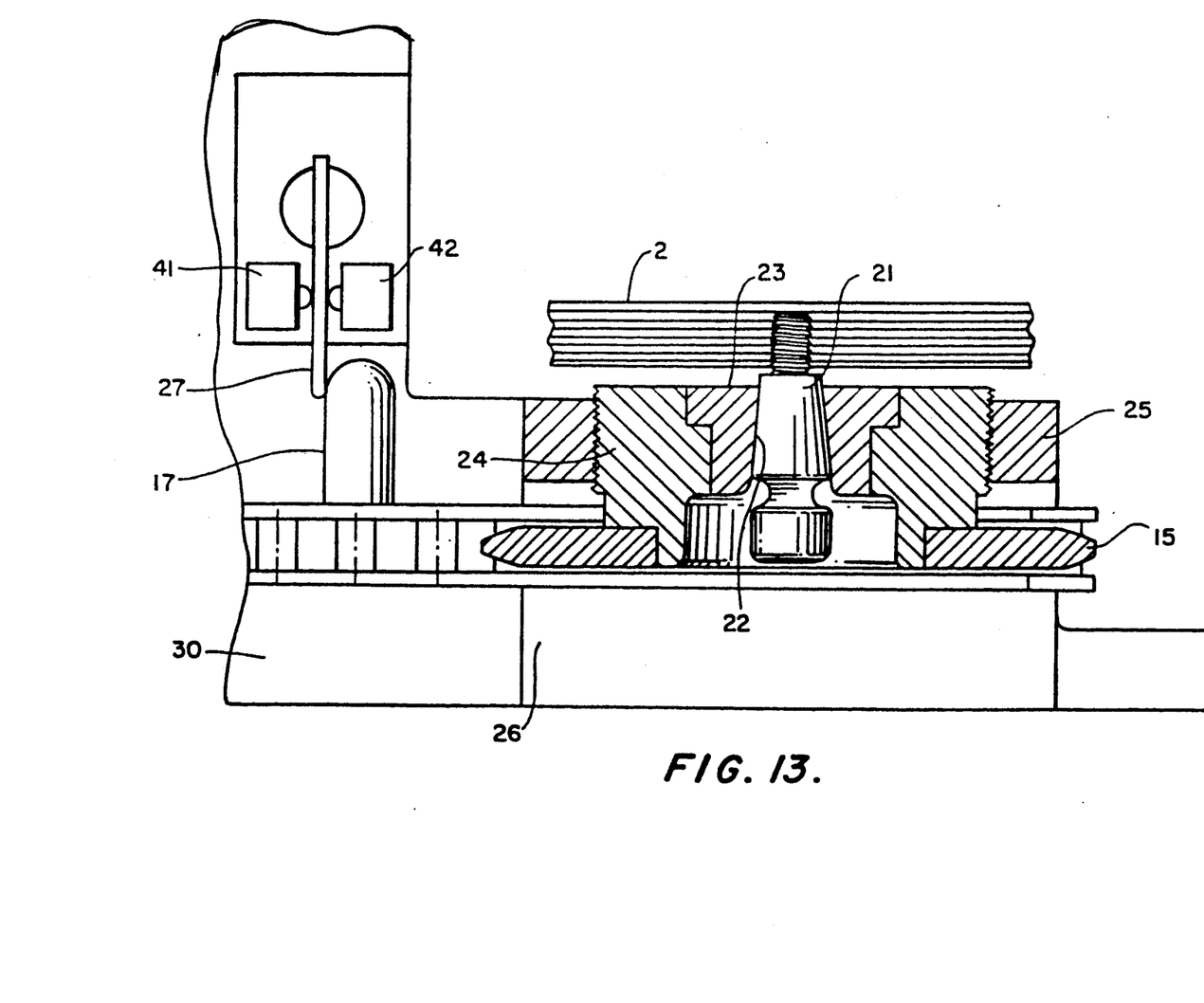
FIG. 13 is a partial cross sectional top view of a fixture used to put the thread on a stopcock.

FIG. 13 is a partial cross sectional top view of a fixture to grind a thread on a stopcock 21. In this case the thread must be concentric to the ground tape 22. The stopcock is placed into a matching taper through the rear of the fixture. The matching taper is made of a relatively soft plastic material such as Teflon (a registered trademark of E. I. du Pont de Nemours & Co.) as an insert 23, which is fastened into the master lead screw 24. This lead screw is in turn screwed into the master lead nut 25 which is fastened into the mounting plate 26. A sprocket 27 is fastened to the master male lead screw 24 and is driven by the reversible motor 20 through the drive chain 15 (shown in FIG. 3). A reversing pin 17 mounted on the face of the sprocket contacts the operating spring 27 mounted between the two limit switches 41 and 42. The mounting plate 26 is mounted on the spindle plate 30.

Figure 14:
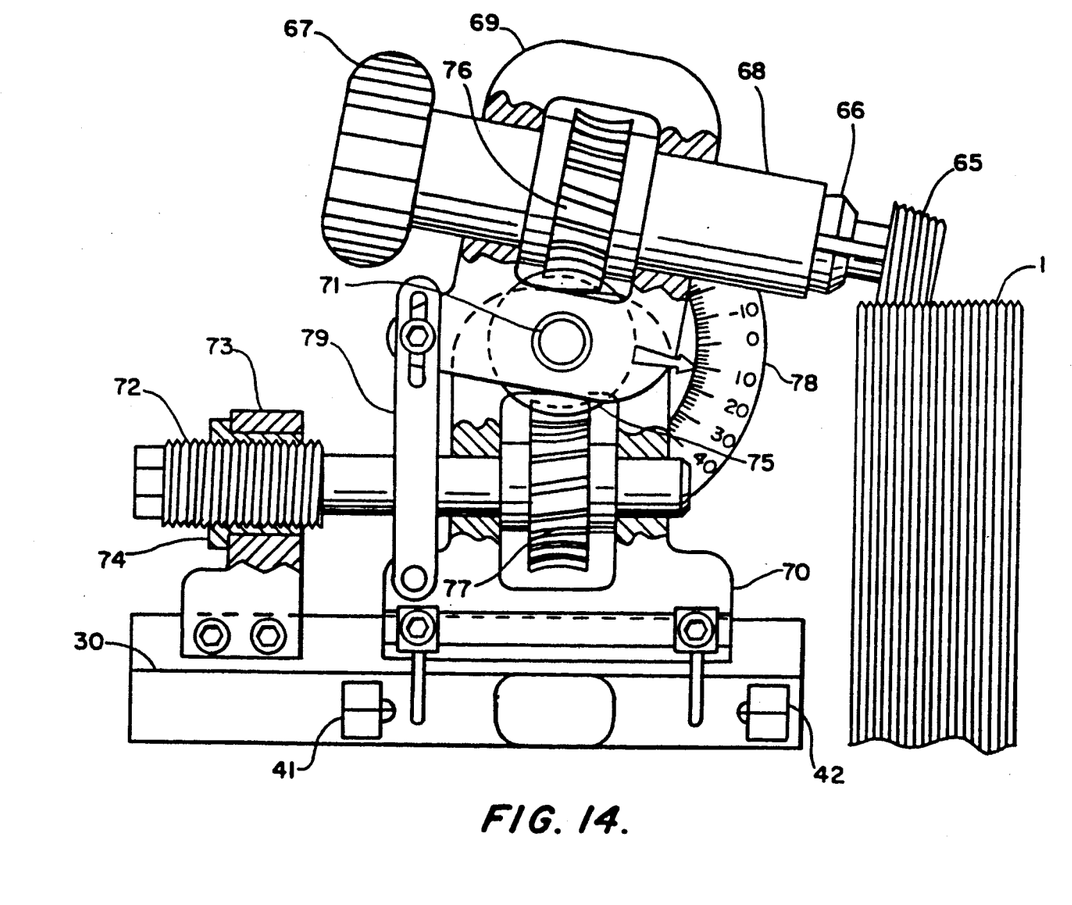
FIG. 14 is a partial cross sectional plane view of a fixture to grind a tapered tread.

FIG. 14 is a partial cross sectional view of a fixture for grinding a tapered thread. The work piece 65 is shown held in a chuck 66, which is operated by a drawbar mounted in the work spindle 68, which is free to rotate in the spindle mounting block 69. The spindle mounting block is rotatably mounted to the cross slide 70 through the shoulder screw 71. The cross slide 70 is slidably mounted to the spindle mounting plate 30 (FIG. 1) and the master spindle 72 is mounted to the spindle mounting plate through two bearing supports 73. The master cam insert 74 is mounted through the cross slide 70.

In order to grind a tapered thread, the work piece 65 must be mounted at the desired angle with respect to the grinding wheel 1 (FIG. 1). However, in order to obtain the pitch, the work piece must also travel linearly parallel to the face of the grinding wheel. In order to accomplish this, the master spindle 73 is driven through the sprocket 15 (FIG. 2). The master cam 74 is engaged with the master spindle. The cross slide 70 moves linearly in accordance with the pitch of the master cam as the master spindle is rotated.

To grind the correct thread the work spindle 68 must rotate in synchronization with the rotation of the master spindle. A wide straight gear 76 is driven by the sprocket and is in mesh with a slightly beveled gear 77. The work piece is driven linearly by the cross slide to produce the pitch and the gears rotate the work piece to produce the thread. The linear movement between the two gears is small, as the reversing pin 17 (FIG. 3) allows only slightly more than one revolution of the master spindle.

Figure 10:
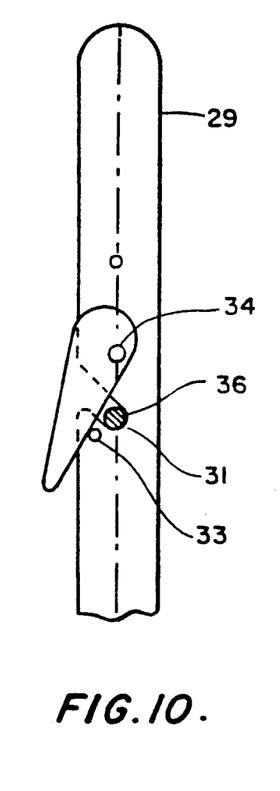

The operator, when starting the machine cycle, raises the spindle support plate 30 causing the notch cover plate 32 to rotate around the pivot pin 34. When the shoulder pin 31 is raised above the notch cover plate, its own weight forces it to rotate and stop against the pin 33 as shown in FIG. 10. This allows the shoulder pin to escape the notch and return to the operating position as shown in FIG. 9. As the spindle support continues to be lowered, the mercury switch 52 (FIG. 3) closes and activates the D.C. spindle drive motor 20.

Figure 15:
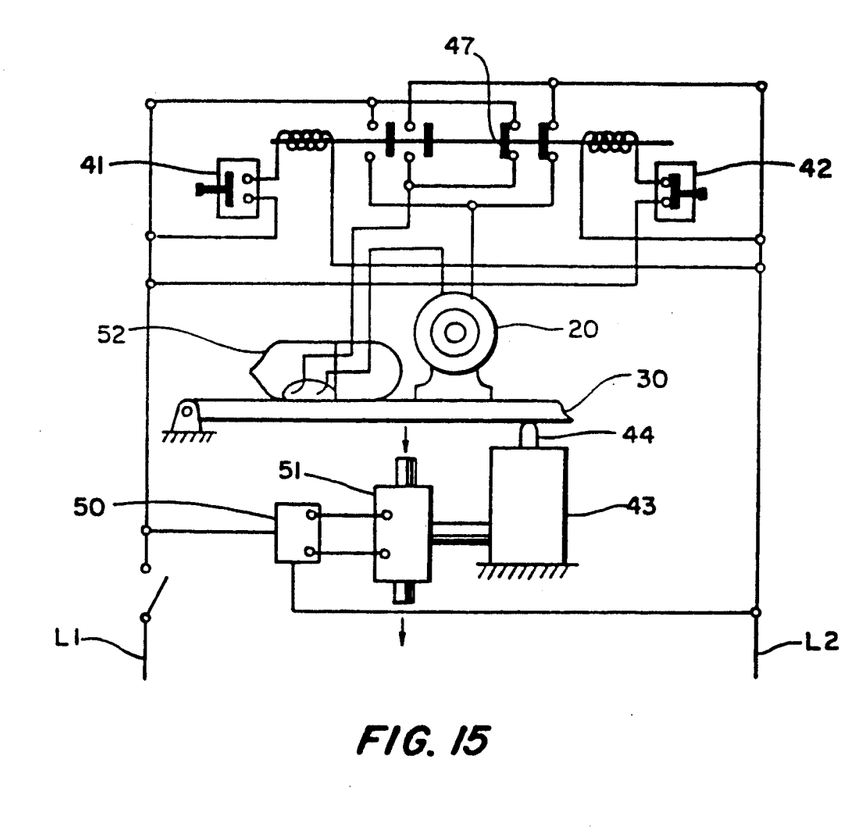
FIG. 15 is a view of the electrical schematic depicting the various components of their electrical relationship.

FIG. 15 is a schematic diagram showing the electrical and pneumatic components of the apparatus. The grinding wheel drive motor and an air pump (neither shown) are operated constantly. A D.C. power source is used to drive the permanent magnet D.C. motor 20. A pair of normally open limit switches 41 and 42 are mounted between and the operating spring 27 (see FIG. 3) in a position to be activated by the reversing pin 17.

When the mercury switch 52 attached to the spindle support plate is closed, the spindle drive motor rotates the work spindle and the reversing pin. As the reversing pin contacts the operating spring, the spring flexes, allowing the operating pin to go 10° to 20° past center before it closes the reversing switch. When the limit switch 41 is operated the latching relay 47 is thrown, Which reverses the polarity of the motor. The motor thereupon reverses rotation, driving the work spindle and reversing pin in the opposite direction until the pin contacts the limit switch 42. This again operates the latching relay 47 and reverses the motor direction to the starting direction. At this point a time delay relay 50 is also activated, which closes the air valve 51, in turn activating the air piston 43 and raising the spindle support plate 30 and the mercury switches 52, cutting off the voltage to the drive motor. The time delay relay then resets and the air is released, allowing the air piston to retract. The support plate is lowered and the shoulder pin 31 shown in FIG. 8 is caught in the slot of the safety latch 29, resetting the electrical circuit so that the operator can restart the cycle by unlatching and lowering the spindle support plate.

Inasmuch as the invention is subject to variations, modifications, and changes in detail, it is intended that the foregoing description, and the accompanying drawings, shall be interpreted merely as illustrative of the invention defined by the claims that follow.

I claim:

1. In a thread grinding machine comprising
    a grinding wheel having a first axis of rotation, and a periphery with plural concentric tooth forms thereon having a given pitch,
    means for supporting the grinding wheel on an axis of rotation,
    means for rotating the wheel about said axis,
    a work spindle having a second axis of rotation,
    means for supporting said work spindle for rotation about said second axis, and a chuck, supported by said work spindle for rotation a workpiece, the improvement comprising means for both rotating said work spindle and feeding said workpiece laterally with respect to said grinding wheel various integral multiples of said grinding wheel pitch per work spindle revolution, whereby threads of said given pitch, but different leads, may be produced by a single grinding wheel.

2. The invention of claim 1, further, comprising means for varying the angular relationship between said first and second axes.

3. The invention of claim 1, further comprising means, for varying the distance between said first and second axes.

4. The invention of claim 1, further comprising a mounting plate supporting said spindle, a stationary support for one end of said plate, and means for varying the elevation of said plate with respect to said grinding wheel.

5. The invention of claim 4, further comprising a latch for supporting said plate in a given position.

6. The invention of claim 5, wherein said grinding wheel is supported by a base, and said latch comprises an arm extending between said base and said plate, and means for locking said arm to said plate.

7. The invention of claim 1, wherein said work spindle has plural external threads thereon of different leads, and further comprising a corresponding plurality of inserts, one of which is brought into engagement with its corresponding thread to produce said lateral workpiece movement.

* * * * *